United States Patent [19]

Agano et al.

[11] Patent Number: 5,557,303

[45] Date of Patent: Sep. 17, 1996

[54] THERMAL RECORDING APPARATUS WHICH CAN DRAW BLACK BORDERS

[75] Inventors: Toshitaka Agano; Nobuyoshi Nakajima, both of Kanagawa-ken, Japan

[73] Assignee: Fuji Photo Film Co., Ltd., Kanagawa, Japan

[21] Appl. No.: 135,029

[22] Filed: Oct. 13, 1993

[30] Foreign Application Priority Data

Oct. 14, 1992 [JP] Japan ................................. 4-276238

[51] Int. Cl.⁶ ........................... B41J 2/38; B41J 2/45
[52] U.S. Cl. ........................... 346/141; 347/187
[58] Field of Search ................... 347/238, 241, 347/239, 255, 256, 233, 185, 187

[56] References Cited

U.S. PATENT DOCUMENTS 4,531,138  7/1985  Endo et al. ................. 347/51

FOREIGN PATENT DOCUMENTS

| 524219 | 2/1973 | Japan . |
|---|---|---|
| 50-23617 | 3/1975 | Japan . |
| 58-94494 | 6/1983 | Japan . |
| 61-291183 | 12/1986 | Japan . |
| 62-78964 | 4/1987 | Japan . |
| 62-77983 | 4/1987 | Japan . |
| 5301447 | 11/1993 | Japan . |

*Primary Examiner*—Mark J. Reinhart
*Attorney, Agent, or Firm*—Sughrue, Mion, Zinn, Macpeak & Seas

[57] ABSTRACT

In a thermal recording apparatus using a thermo-sensitive recording medium, a semiconductor laser outputs a laser beam modulated according to a gradation signal of an image to be recorded for a first time interval required to scan an image region of the recording medium, and an acousto-optic modulator modulates a laser beam generated by a gas laser to supply the image region with heat energy less than a coloring energy of the recording medium for the first time interval, and to supply a region other than the image region with a high energy exceeding the coloring energy for a time interval required to scan the other region, to draw black borders surrounding the image recorded on the recording medium.

14 Claims, 10 Drawing Sheets

THERMAL RECORDING APPARATUS WHICH CAN DRAW BLACK BORDERS

BACKGROUND OF THE INVENTION

1. Field of the Invention

This invention relates to a thermal recording apparatus capable of drawing black borders on the periphery surrounding an image region of a thermo-sensitive recording medium by heating the recording medium with an auxiliary heating means.

2. Description of the Related Art

A thermal recording apparatus for applying heat energy to a thermo-sensitive recording medium thereby to record an image or the like thereon is now widely in use. In particular, a thermal recording apparatus with a laser as a heat source, which can record an image at high speed, has been proposed (see Japanese Laid-Open Patent Publication Nos. 50-23617, 58-94494, 62-77983 and 62-78964, for example).

The present applicant has proposed a thermo-sensitive recording medium which is applicable to such a thermal recording apparatus and capable of recording a satisfactory image thereon, which provides leuco dyes, a developer and light-absorbing dyes on a support and develops color whose density varies in response to heat energy applied thereto, and also proposed an apparatus which is capable of recording an image on the proposed thermo-sensitive medium with a laser beam (see Japanese Patent Application No. 3-62684 and Japanese Laid-Open Patent Publication No. 5-24219).

The thermo-sensitive recording medium, proposed by the applicant, provides a thermo-sensitive layer formed on the support which is coated with an emulsion containing the developer, the light-absorbing dyes and a heat-fusible microcapsule including at least the leuco dyes, all dissolved and emulsified in an organic solvent which is insoluble or hardly-soluble in water.

The leuco dyes, normally almost colorless, having the properties of developing color by donating electrons, or accepting protons from such as protonic acids, are chosen from those compound including partial molecular structure therein such as lactone, lactam, sultone, spiropyran, ester, amide, etc, which produce an open ring or a cleavage when held in contact with the developer. Examples of such compounds may include crystal violet lactone, benzoyl leuco methylene blue, malachite green lactone, rhodamine B lactam, 1,3,3-trimethyl-6'-ethyl-8'-butoxyindolinobenzospiropyran, etc.

Acidic substances such as phenolic compounds, organic acids or metallic salts thereof, oxybenzoate ester, etc are used as the developer for these leuco dyes. The developer may preferably have a melting point ranging from 50° C. to 250° C. Particularly preferred is phenol or an organic acid insoluble in water, having a melting point ranging from 60° C. to 200° C. Examples of the developer have been shown in Japanese Patent Application Laid-Open Publication No. 61-291183, for example.

Preferred as the light-absorbing dyes are those which show low absorption in the visible-light region and particularly high absorption in the infrared region. Examples of the dyes may include cyanine dyes, phthalocyanine dyes, pyrylium and thiopyrylium dyes, azulenium dyes, squarylium dyes, metal complex salt dyes of Ni, Cr, etc, naphthoquinone and anthraquinone dyes, indophenol dyes, indoaniline dyes, triphenylmethane dyes, triallylmethane dyes, aminium and diimmonium dyes, nitroso compounds, etc.

When a medical image is recorded on the thermo-sensitive recording medium, which is obtained by X-ray photography for example, it is preferable to draw so-called black borders by blackening the outer periphery of the thermo-sensitive recording medium surrounding the image. The black borders are useful to ease the observation of the image on the recording medium put on a film viewer, by preventing unnecessary light from coming into the image. Therefore, the darker the black border, the more it is useful.

In order to draw darker black borders, however, it becomes necessary to provide a thermal energy higher than the thermal energy required to record an ordinary image. Thus, a problem arises that a higher-output semiconductor laser is required for this purpose, which results in a higher apparatus cost.

SUMMARY OF THE INVENTION

It is therefore an object of the present invention to provide a thermal recording apparatus for recording an image on a thermo-sensitive recording medium which develops color whose density varies in response to the heat energy applied thereto, wherein high-density black borders can be drawn.

In order to achieve the above object, according to a first aspect of the present invention, there is provided a thermal recording apparatus comprising main heating means for supplying heat energy according to a gradation signal of the image to be recorded to at least an image region of the thermo-sensitive recording medium for a first time interval required to scan the image region, and auxiliary heating means for heating the image region to a predetermined temperature lower than a coloring temperature of the thermo-sensitive recording medium for the first time interval, and heating a region other than the image region to a predetermined temperature exceeding the coloring temperature for a second time interval required to scan the other region.

In the above thermal recording apparatus, according to the first aspect of the invention, the auxiliary heating means may comprise a gas laser and an acousto-optic modulator, and the modulator may modulate a laser beam generated by the gas laser to pre-heat the image region to a temperature slightly lower than the coloring temperature, and to supply the other region with heat energy sufficiently above a coloring energy to draw there black borders surrounding the image region.

Further in the above thermal recording apparatus, a semiconductor laser used as the main heating means outputs a laser beam modulated according to the gradation signal of the image to be recorded for the first time interval. The semiconductor laser may also output an unmodulated laser beam having predetermined energy for the second time interval to assist the auxiliary heating means to draw the black borders.

The respective laser beams outputted from the semiconductor laser and the acousto-optic modulator may be combined together into one beam so as to be irradiated onto the thermo-sensitive recording medium.

According to a second aspect of the present invention, the auxiliary heating means comprises a heating member having a length perpendicular to the sub-scanning direction, and is disposed adjacent to or in contact with the thermo-sensitive recording medium which is held between rollers at respective ends upstream and downstream of the image region and fed for sub-scanning, and the thermo-sensitive recording medium is supplied with a predetermined thermal energy exceeding the coloring energy by the auxiliary heating means in each of regions having a predetermined length upstream and downstream of the image region in the sub-scanning direction. In the above thermal recording apparatus, the main heating means may supply thermal energy exceeding the coloring energy, in addition to the thermal energy modulated by the gradation signal of the image, to form black borders on both sides of the image region inbetween upstream and downstream in the sub-scanning direction of the thermo-sensitive recording medium.

The above and other objects, features and advantages of the present invention will become apparent from the following description and the appended claims, taken in conjunction with the accompanying drawings in which a preferred embodiments of the present invention is shown by way of illustrative example.

DESCRIPTION OF THE PREFERRED EMBODIMENTS

A thermal recording apparatus of the present invention will hereinafter be described in detail with reference to the accompanying drawings in which preferred embodiments are shown by way of illustrative example.
(First Embodiment)

Figure 1:
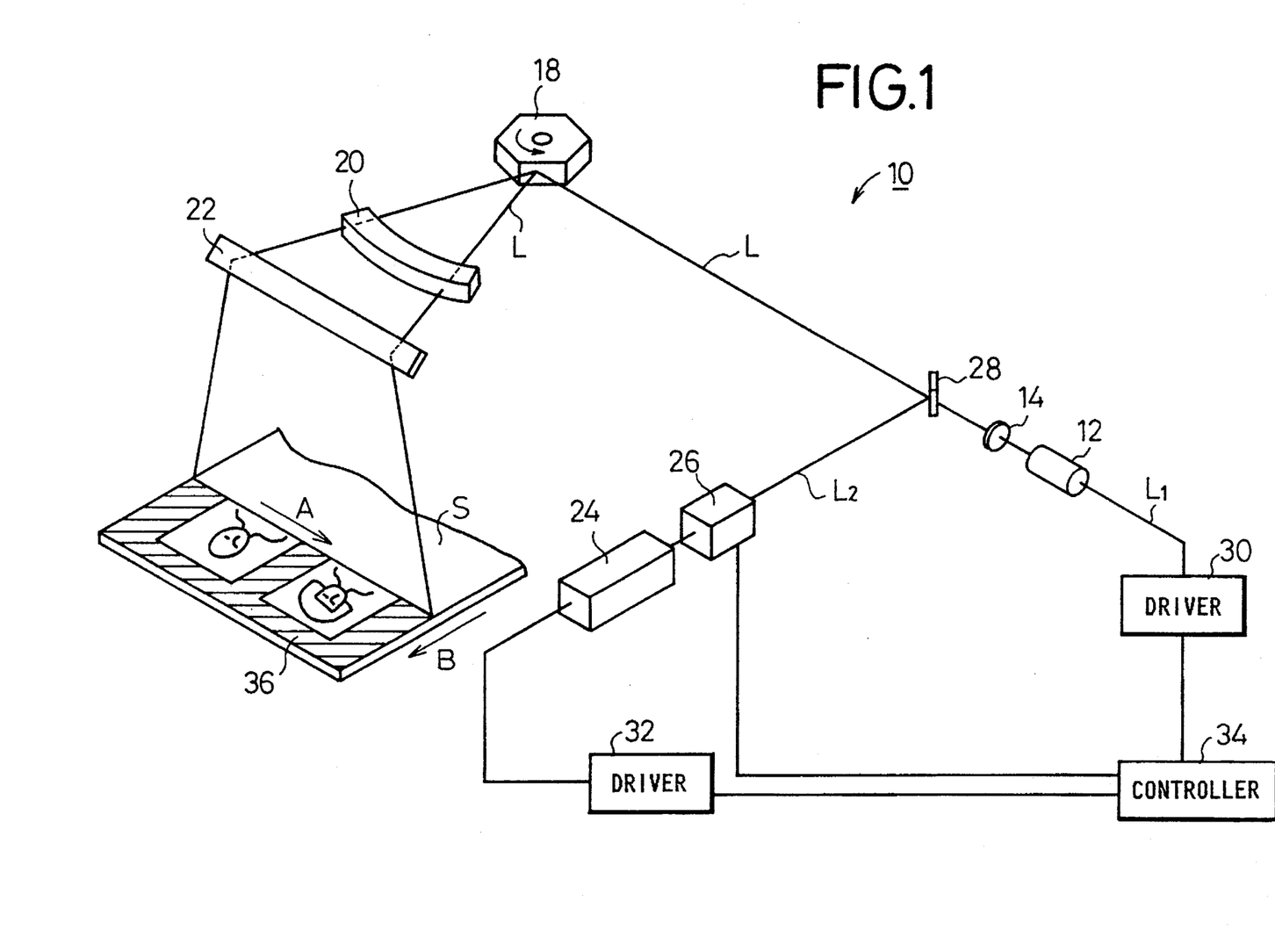
FIG. 1 is a view showing the structure of a thermal recording apparatus according to a first embodiment of the present invention.

In FIG. 1, reference numeral 10 designates a thermal recording apparatus according to a first embodiment of the present invention. The thermal recording apparatus 10 causes a thermo-sensitive recording medium S fed for sub-scanning in the direction indicated by the arrow B to be main-scanned with a laser beam L in the direction indicated by the arrow A, and records the scanned images or the like on the thermo-sensitive recording medium S. The aforementioned medium disclosed in Japanese Patent Application No. 3-62684 and Japanese Laid-Open Patent Publication No. 5-24219, for example, may preferably be used as the thermo-sensitive recording medium S, which provides leuco dyes, a developer and light-absorbing dyes all provided on a support and develops color whose density varies in response to the heat energy applied thereto.

Figure 9:
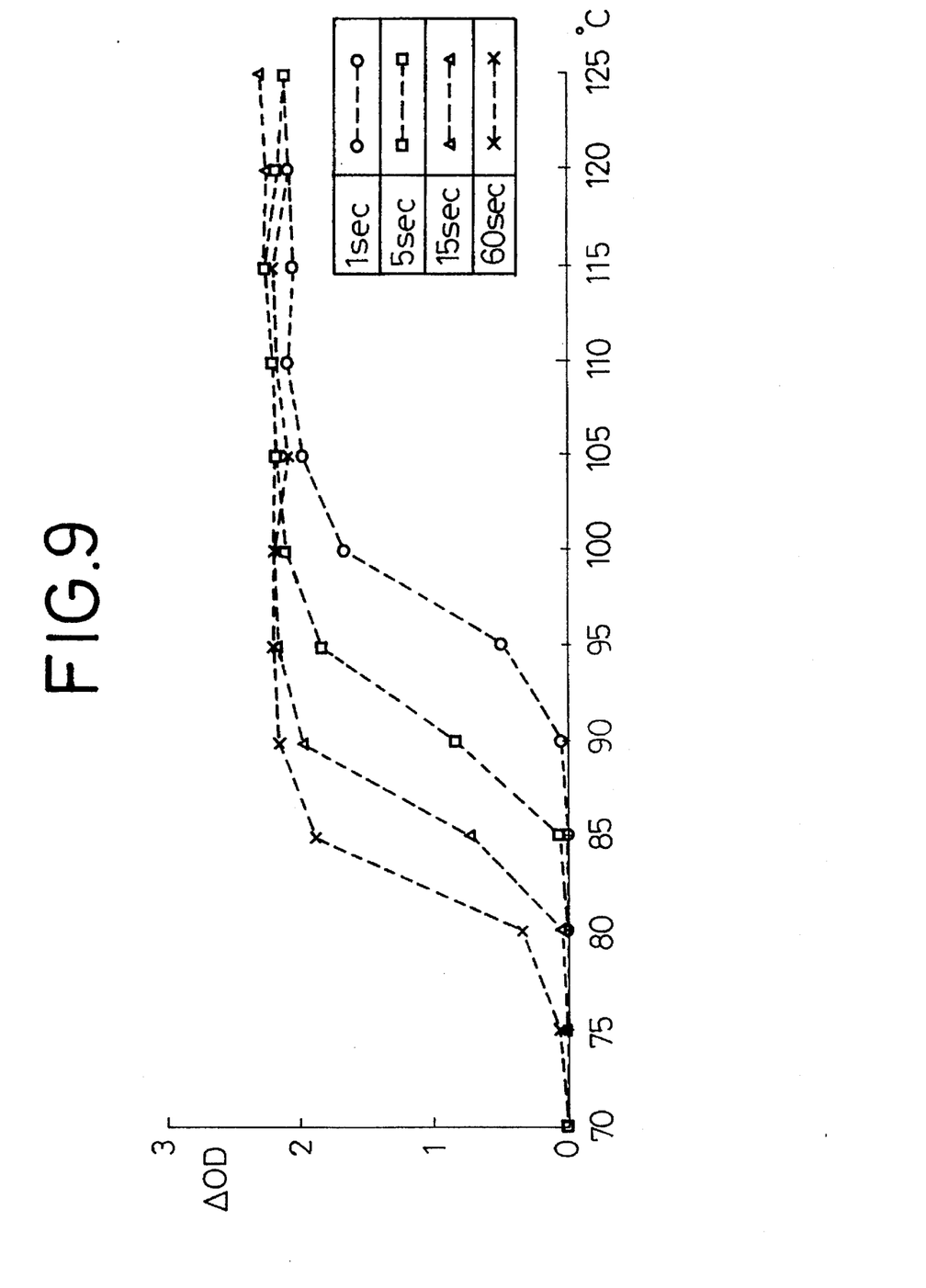
FIG. 9 is a graph for describing the relationship between the density of developed color and the heating temperature corresponding to respective heating time periods.

The quantity of the applied heat energy is represented by a product of the temperature and time at which and during which the thermo-sensitive recording medium is heated. Therefore, the color can be developed either by raising the heating temperature in a certain time period or by extending the heating time at a constant temperature, as shown in FIG. 9.

The thermal recording apparatus 10 comprises a semiconductor laser 12 used as main heating means for emitting a laser beam $L_1$ therefrom, a collimator lens 14 for making the laser beam $L_1$ parallel as a bundle of light rays, a polygon mirror 18 for deflecting the laser beam $L_1$, an fθ lens 20, a mirror 22, a gas laser 24 used as auxiliary heating means, an acousto-optic modulator (AOM) 26 for modulating the intensity of a laser beam $L_2$ generated by the gas laser 24. The gas laser 24 supplies the thermo-sensitive recording medium S with a pre-heating energy less than a coloring energy of the thermo-sensitive recording medium S and with a blackening energy sufficiently above the coloring energy, for respective time intervals during a main-scanning time period. The apparatus also comprises a laser-beam combining mirror 28 for superimposing the laser beam $L_1$ with the laser beam $L_2$ outputted from the AOM 26. The combined laser beam is sent to the polygon mirror 18.

The respective outputs of the semiconductor laser 12 and the gas laser 24 are controlled by a controller 34 through their corresponding drivers 30 and 32.

The thermal recording apparatus 10 according to the present embodiment is basically constructed as described above. The operation of the thermal recording apparatus 10 will next be described below.

Incidentally, apparatus 10 according to the present embodiment is capable of recording multiple images at the same time on the same thermo-sensitive recording medium S, as well as a single image. A case will be described, where two independent images are simultaneously recorded, side by side.

The controller 34 causes the driver 32 to drive the gas laser 24 and causes the acousto-optic modulator 26 to modulate the laser beam $L_2$ generated by the gas laser 24. The modulated laser beam $L_2$ supplies a predetermined heat energy to the thermo-sensitive recording medium S. Time-varying intensity of the laser beam $L_2$ modulated by the AOM 26 is illustrated in the diagram (B) of FIG. 2.

Figure 2:
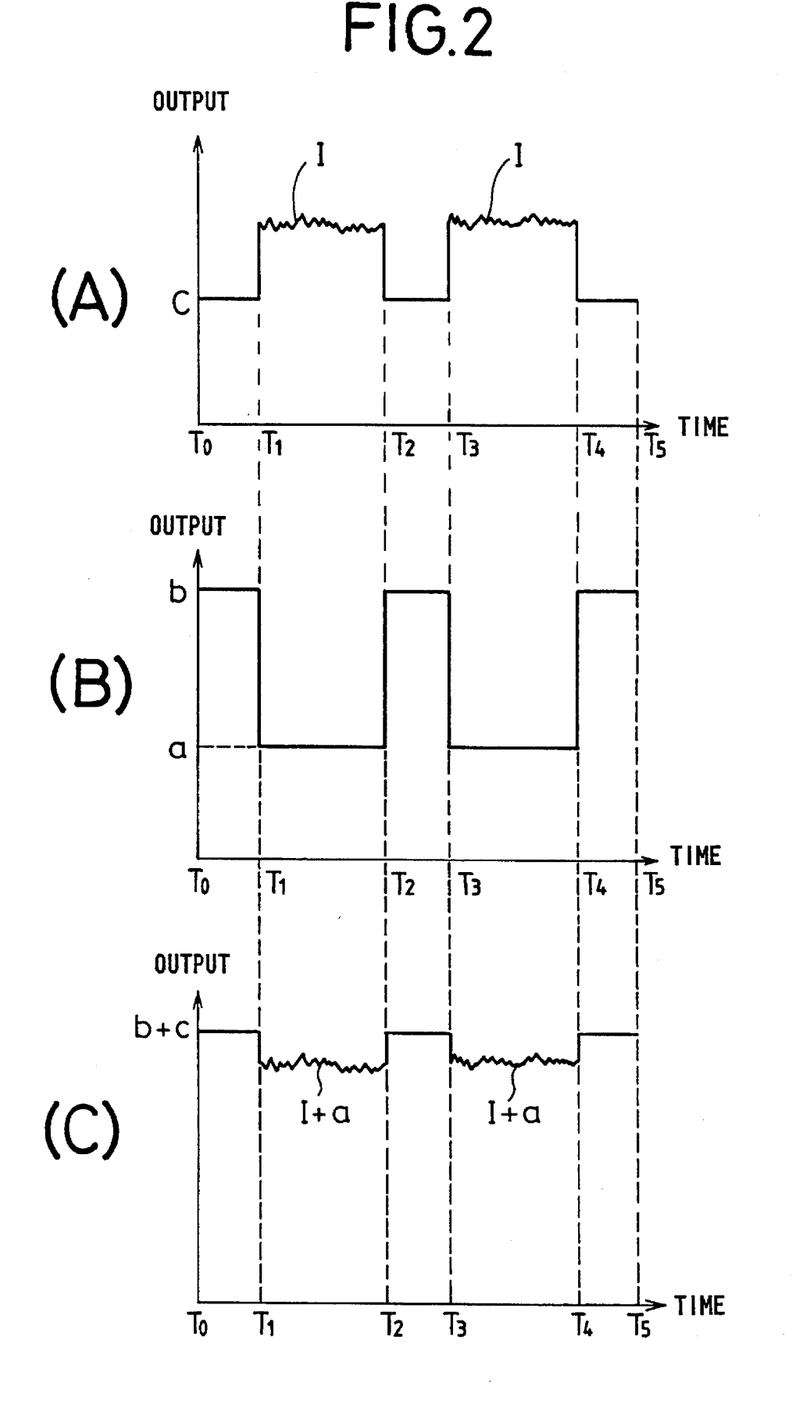
FIG. 2 is a combined diagram showing an output of a semiconductor laser (A), an output of an acousto-optic modulator (B) and a combined output (C) obtained by superimposing (A) and (B).

The AOM 26 modulates the laser beam $L_2$ so as to output a low heat energy a, slightly below the coloring energy of the thermo-sensitive recording medium S, for each of time intervals, $T_1$ to $T_2$ and $T_3$ to $T_4$ corresponding to respective images arranged side by side, for example, within one main-scanning cycle which begins at $T_0$ and ends at $T_5$. A total of the time intervals $T_1$ to $T_2$ and $T_3$ to $T_4$ corresponds to the above-mentioned first time interval.

Further, the AOM 26 modulates the laser beam $L_2$ so as to output a high heat energy b sufficiently higher than the coloring energy to draw three black borders 36 surrounding and extending between respective images, for each of time intervals, $T_0$ to $T_1$, $T_2$ to $T_3$ and $T_4$ to $T_5$ within one main-scanning cycle. A total of the time intervals $T_0$ to $T_1$, $T_2$ to $T_3$ and $T_4$ to $T_5$ corresponds to the above-mentioned second time interval. The laser beam $L_2$ modulated by the AOM 26 is introduced into the polygon mirror 18 through the laser-beam combining mirror 28.

The controller 34, concurrently with the above described process, causes the driver 30 to drive the semiconductor laser 12. The semiconductor laser 12 outputs the laser beam $L_1$ modulated according to gradation signals of respective images to be recorded on the thermo-sensitive recording medium S. Time varying intensity of the laser beam $L_1$ which corresponds to the gradation signals I of respective images in each of the time intervals, $T_1$ to $T_2$ and $T_3$ to $T_4$ within one main-scanning cycle, is illustrated in diagram (A) of FIG. 2. On the other hand, for each of the time intervals, $T_0$ to $T_1$, $T_2$ to $T_3$ and $T_4$ to $T_5$, the laser beam $L_1$ having a constant energy level c is outputted.

The so-modulated laser beam $L_1$ passes through the laser-beam combining mirror 28 via the collimator lens 14 and is introduced into the polygon mirror 18.

The laser beam $L_2$ modulated by the AOM 26 and the laser beam $L_1$ directly modulated by and outputted from the semiconductor laser 12 are combined together by the laser-beam combining mirror 28 so as to form a laser beam L. The intensity of the combined laser beam L varies as illustrated in diagram (C) of FIG. 2.

The laser beam L is reflected by each of reflecting surfaces of the polygon mirror 18 which is rotating at high speed, and introduced onto the surface of the thermo-sensitive recording medium S through the fθ lens 20 and the mirror 22. The laser beam L main-scans in the direction indicated by the arrow A the thermo-sensitive recording medium S. After every main-scanning cycle, the thermo-sensitive recording medium S is fed in the direction indicated by the arrow B for the sub-scanning. Thus, the desired image is recorded on the thermo-sensitive recording medium S.

During each of the time intervals, $T_0$ to $T_1$, $T_2$ to $T_3$ and $T_4$ to $T_5$, shown in diagram (C) of FIG. 2, the black borders 36 are drawn by a high energy laser beam b+c which is obtained by combining the laser beam $L_1$ at its energy level c and the laser beam $L_2$ at its energy level b. Thus, the black borders 36 having a desired density can be drawn by the semiconductor laser 12 which provides a relatively low output, under the help by the auxiliary heating means.

During each of the time intervals, $T_1$ to $T_2$ and $T_3$ to $T_4$, respective images are formed on the thermo-sensitive recording medium S by a laser beam having its energy level I+a which is obtained by combining the laser beam $L_1$ modulated according to the gradation signals I of respective images and the laser beam $L_2$ having its energy level a. Here, the laser beam $L_2$ having its energy level a works as if it is pre-heating the thermo-sensitive recording medium S to a temperature slightly below the coloring temperature, and images having a desired density are readily formed by the laser beam $L_1$ bearing the gradation signals I.

Thus, as shown in FIG. 1, each image, which has been recorded on the thermo-sensitive recording medium S, is surrounded by the black borders 36 formed by blackening the outer periphery and a region or regions lying between the images on the thermo-sensitive recording medium S. As a result, when it is desired to observe the recorded images by using a film viewer, for example, the black borders 36 enable to prevent unnecessary light from coming into the recorded images to observe them distinctly.

Incidentally, the present embodiment has described the case where laser devices are used as the main and auxiliary heating means. However, the present invention is not necessarily limited to this embodiment. For example, a thermal head and the like may be used as the main and/or auxiliary heating means.

Alternatively, a thermo-sensitive recording medium having electrodes shaped in the form of a matrix may be used. This type of thermo-sensitive recording medium comprises a stripe-shaped electrode layer having a number of electrode lines parallel in the main scanning direction, a conductive layer, a stripe-shaped electrode layer parallel in the sub scanning direction and a sensitized material layer all of which are formed in a stack. When a desired electrode is selected from a plurality of electrodes of the respective stripe-shaped electrode layers and energized, the conductive layer corresponding to a desired portion intersecting the electrode can generate heat. Here, the sensitized material layer is heated by the conductive layer to a temperature at which a black border is formed, and is heated to a coloring temperature corresponding to the gradation signal of the image. As a result, a desired image can be obtained. Since the entire surface of the thermo-sensitive recording medium having the matrix electrodes is not heated, the thermo-sensitive recording medium does not need large current and is low in cost.

When the thermo-sensitive recording medium S is irradiated with the laser beam L so as to record desired images thereon with higher accuracy, it is of importance that portions before and after portions to be recorded are held and conveyed by rollers to avoid a position displacement of the thermo-sensitive recording medium S at the time of recording of the images thereon.

(Second Embodiment)

Figure 3A:
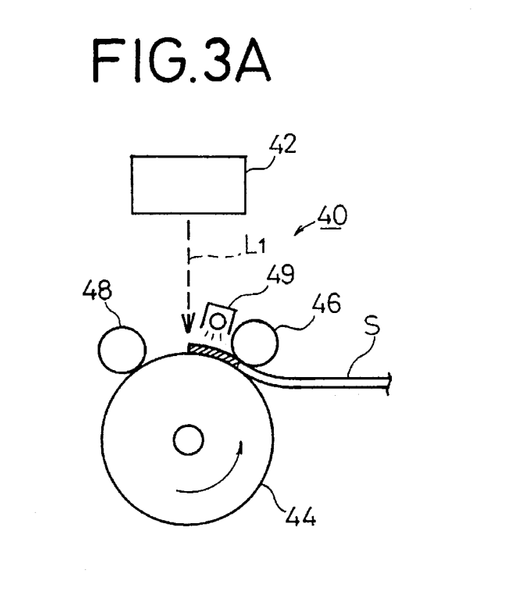
FIGS. 3A through 3C are views schematically showing a thermal recording apparatus according to a second embodiment of the present invention.
Figure 3B:
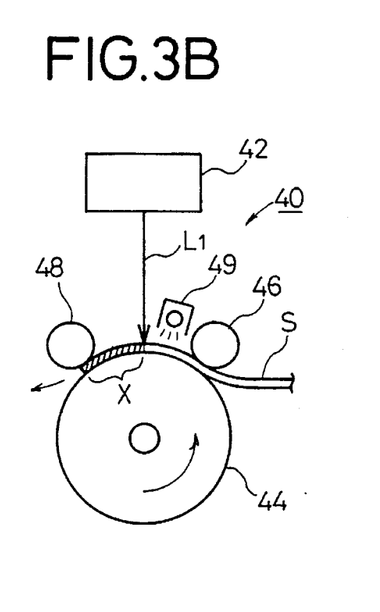
Figure 3C:
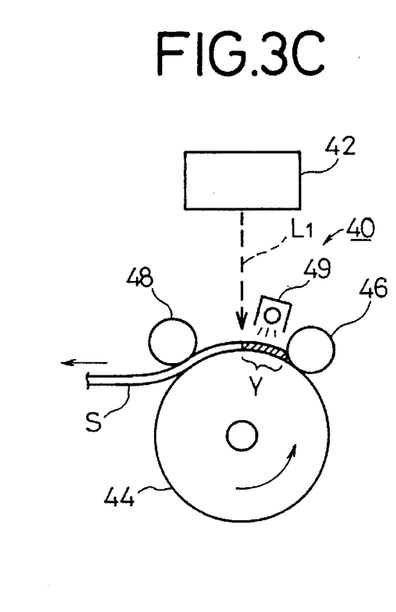

A thermal recording apparatus 40 according to a second embodiment of the present invention will next be shown in FIGS. 3A through 3C. Incidentally, an optical system comprised of the semiconductor laser 12, the collimator lens 14, the polygon mirror 18, the fθ lens 20 and the mirror 22 all of which are shown in FIG. 1, will be described as a laser beam irradiating mechanism 42 in the following embodiments.

When a thermo-sensitive recording mediums S is irradiated with a laser beam $L_1$ emitted from the laser beam irradiating mechanism 42 to record desired images thereon, the thermo-sensitive recording medium S is held by a preheating roller 44 and a pair of feed rollers 46 an 48. That is, the thermo-sensitive recording medium S is not irradiated with the laser beam $L_1$ emitted from the laser beam irradiating mechanism 42 until the time (see FIG. 3B) when the thermo-sensitive recording medium S is held by the feed roller 48 on the downstream side and the preheating roller 44. The reason is that since the thermo-sensitive recording medium S is not reliably held between the feed rollers 46 and 48 and the preheating roller 44, the leading end of the thermo-sensitive recording medium S is warped or bent upward and the position of a portion to be recorded with the laser beam $L_1$ is displaced. Similarly, the thermo-sensitive recording medium S is not irradiated with the laser beam $L_1$ after the time (see FIG. 3C) when the rear end of the thermo-sensitive recording medium S has been separated from the feed roller 46 provided on the upstream side.

Thus, since the laser beam $L_1$ is irradiated onto the thermo-sensitive recording medium S when the thermo-sensitive recording medium S has been reliably held by the feed rollers 46 and 48 provided on the upstream and downstream sides, portions on which gradation images cannot be recorded by the laser beam $L_1$ are formed on the surface of the thermo-sensitive recording medium S. That is, these portions respectively correspond to a portion X (hereinafter called a "leading end portion" of the thermo-sensitive recording medium S) shown in FIG. 3B and a portion Y (hereinafter called a "rear end portion" of the thermo-sensitive recording medium S) shown in FIG. 3C. Thus, in the following embodiments, the portions referred to above are blackened so that the recorded images can be easily seen.

The thermal recording apparatus 40 according to the second embodiment includes the feed rollers 46 and 48 disposed on the upstream and downstream sides of the thermo-sensitive recording medium S irradiated with the laser beam $L_1$ from the laser beam irradiating mechanism 42, a heating roller 44 for supplying the thermo-sensitive recording medium S with a predetermined quantity of heat energy less than a coloring energy and an infrared lamp 49 disposed between the feed roller 46 and a recording portion irradiated with the laser beam $L_1$, for supplying the leading and rear end portions of the thermo-sensitive recording medium S with a predetermined quantity of heat energy exceeding a coloring energy with which the predetermined portions can be blackened. Each of the feed rollers 46 and 48, the heating roller 44 and the infrared lamp 49 is provided over a predetermined length along a sub scanning direction of the thermo-sensitive recording medium S. Here, the heating roller 44 and the infrared lamp 49 serve as an auxiliary heating means for supplying the heat energy to the thermo-sensitive recording medium S. In the following embodiments, the same elements as those employed in the thermal recording apparatus 40 shown in FIGS. 3A through 3C are identified by like reference numerals and their detailed description will therefore be omitted.

When the heating roller 44 is driven so as to rotate in a direction indicated by arrow, the thermo-sensitive recording medium S is held between the feed roller 46 and the heating roller 44. At this time, the heating roller 44 is energized so that the thermo-sensitive recording medium S is supplied with the predetermine heat energy less than the coloring energy. Next, the infrared lamp 49 is energized to irradiate the leading end portion of the thermo-sensitive recording medium S with infrared radiation. As a result, the portion or region X of the leading end portion of the thermo-sensitive recording medium S, on which the laser beam $L_1$ is not radiated, is blackened.

Figure 4:
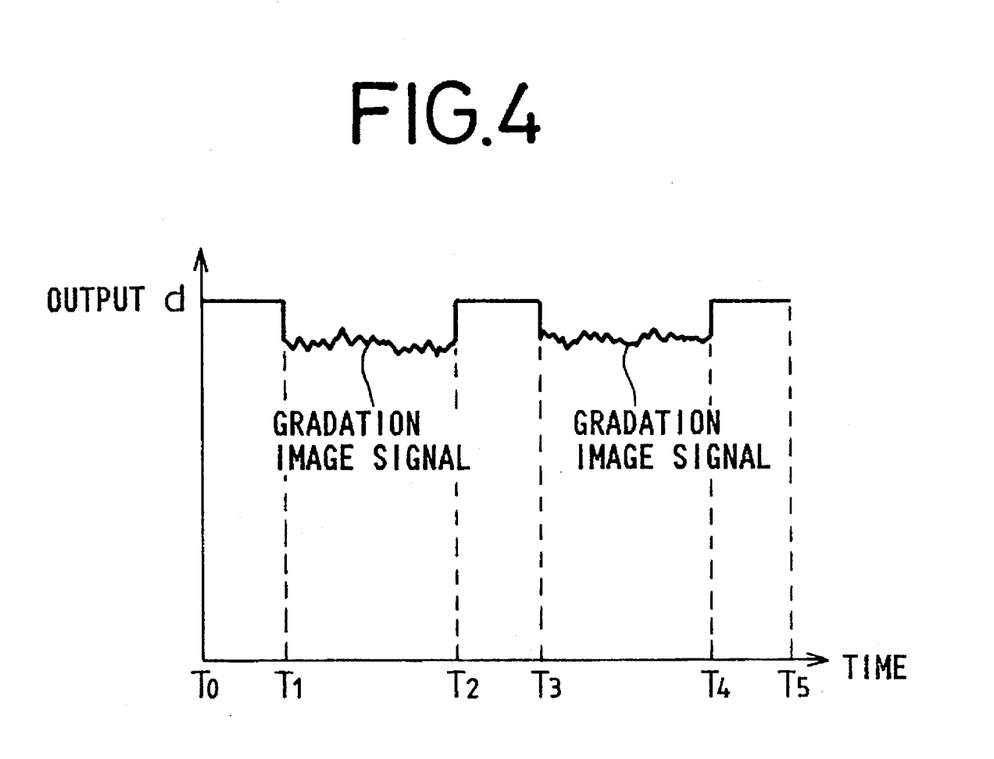
FIG. 4 is graph for describing an output characteristic of a laser beam irradiating mechanism.

Next, the infrared lamp 49 is turned off when the region X has been blackened. When the leading end portion of the thermo-sensitive recording medium S is conveyed and held between the feed roller 48 and the heating roller 44 (see FIG. 3B), a laser beam $L_1$ having high heat or thermal energy is emitted from the laser beam irradiating mechanism 42 to form a black border and a laser beam $L_1$ having thermal energy corresponding to a gradation signal of the image is irradiated on the recording portion from the laser beam irradiating mechanism 42. As a result, the black border is formed and desired images are recorded on the recording portion of the thermo-sensitive recording medium S. An output characteristic of the laser beam $L_1$ irradiated on the recording portion from the laser beam irradiating mechanism 42 is illustrated in FIG. 4. That is, the black border is formed by a high output signal d during each of time intervals of $T_0$ to $T_1$, $T_2$ to $T_3$ and $T_4$ to $T_5$, whereas the desired images are recorded on the recording portion during each of time intervals of $T_1$ to $T_2$ and $T_3$ to $T_4$. The black border formed by the laser beam $L_1$ are recorded on portions or regions having predetermined widths at both ends of the thermo-sensitive recording medium S, which extends in the main scanning direction and a portion or region having a predetermined width provided between the recorded images so as to continuously extend over the region X of the leading end portion of the thermo-sensitive recording medium S. Here, the black border formed by the laser beam $L_1$ is described where the divided two images are recorded on the thermo-sensitive recording medium S as shown in FIG. 1 by way of illustrative example. A black border employed in each of the following embodiments is also treated in the same manner as that described in the aforementioned embodiment and its detailed description will therefore be omitted.

During a period in which the thermo-sensitive recording medium S is being irradiated with the laser beam $L_1$ emitted from the laser beam irradiating mechanism 42, the infrared lamp 49 is off. The heating of the thermo-sensitive recording medium S by the heating roller 44 may be carried out immediately before the irradiation of the thermo-sensitive recording medium S with the laser beam $L_1$ or simultaneously with the irradiation of the thermo-sensitive recording medium with the laser beam $L_1$.

When the thermo-sensitive recording medium S is moved away from the feed roller 46 after the desired images have been recorded on the thermo-sensitive recording medium S, the infrared lamp 49 is turned on to blacken the portion or region Y of the rear end portion of the thermo-sensitive recording medium S. Thus, the images are recorded on corresponding image recording portions of the thermo-sensitive recording medium S by the laser beam $L_1$ and a black border adjacent to each of the image recording portions and having a predetermined width extending along the main scanning direction is recorded. Further, a black border is formed on the leading and rear end portions, other than the image recording portions, of the thermo-sensitive recording medium S by the infrared lamp 49. As a result, the continuous black border is formed so as to surround the images recorded on the thermo-sensitive recording medium S.

(Third Embodiment)

Figure 5A:
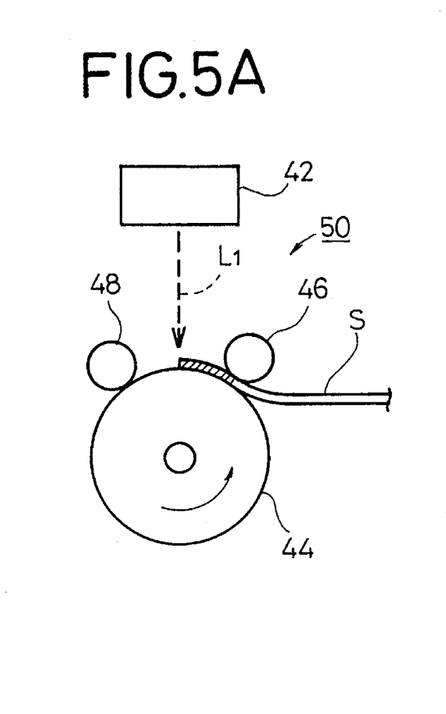
FIGS. 5A through 5C are views schematically illustrating a thermal recording apparatus according to a third embodiment of the present invention.
Figure 5B:
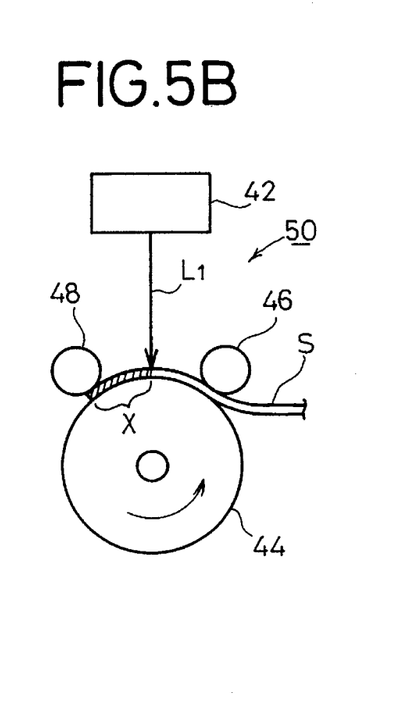
Figure 5C:
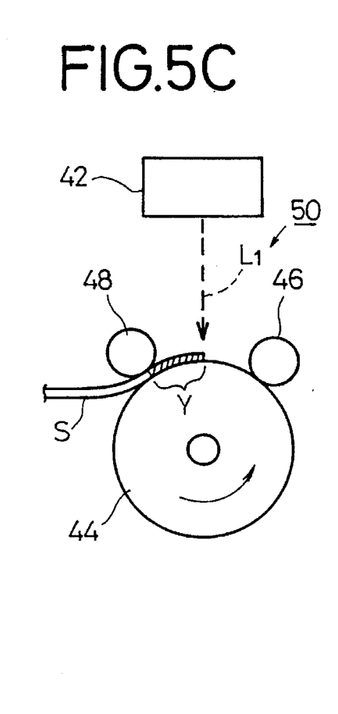

A thermal recording apparatus 50 according to a third embodiment of the present invention will next be shown in FIGS. 5A through 5C. The thermal recording apparatus 50 according to the present embodiment is different from the thermal recording apparatus 40 shown in FIGS. 3A through 3C in that the infrared lamp 49 is not included. In the present embodiment, a heating roller 44 serves as an auxiliary heating means.

The thermal recording medium 50 according to the present embodiment, which is constructed as described above, is operated in the following manner. During a period of from the time when a leading end portion of a thermo-sensitive recording medium S has been interposed between a feed roller 46 on the upstream side and the heating roller 44 to the time when the leading end portion is brought into a state shown in FIG. 5A, the rotational speed of the heating roller 44 is reduced by an unillustrated rotation controlling means. That is, the rotational speed of the heating roller 44 at the time of recording images on the thermo-sensitive recording medium S is reduced by a predetermined time interval to thereby increase thermal energy and apply it to the thermo-sensitive recording medium S. As a result, the thermo-sensitive recording medium S is supplied with a predetermined heat energy more than or equal to the coloring energy so that a region X of the leading end portion of the thermo-sensitive recording medium S is blackened (see FIG. 5A).

Similarly, when the rotational speed of the heating roller 44 is reduced after desired images have been recorded on the thermo-sensitive recording medium S by a laser beam $L_1$ as shown in FIG. 5B, a region Y of a rear end portion of the thermo-sensitive recording medium S is blackened (see FIG. 5C). Thus, a black border can be formed on the thermo-sensitive recording medium S.

(Fourth Embodiment)

Figure 6A:
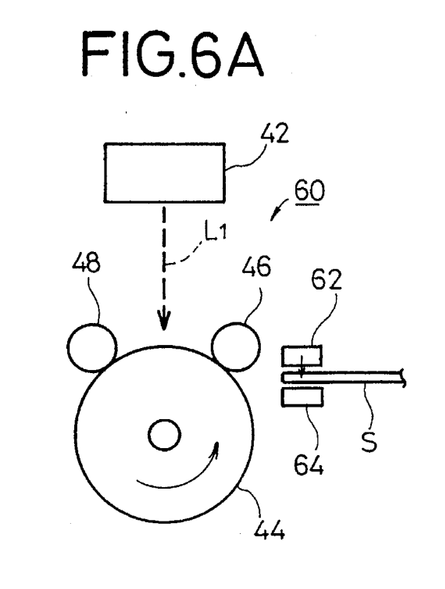
FIGS. 6A through 6C are views schematically depicting a thermal recording apparatus according to a fourth embodiment of the present invention.
Figure 6B:
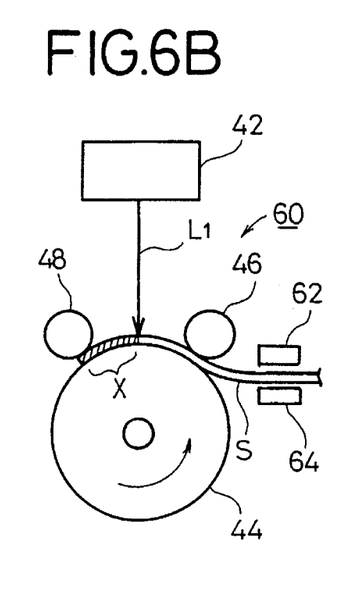
Figure 6C:
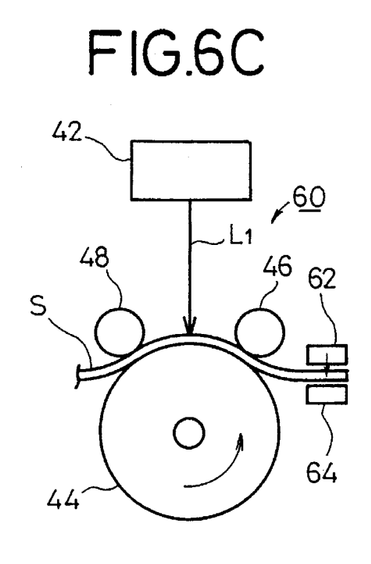

A thermal recording apparatus 60 according to a fourth embodiment of the present invention will now be shown in FIGS. 6A through 6C. The thermal recording apparatus 60 according to the present embodiment differs from the thermal recording apparatus 40 according to the second embodiment in that a heating element 62 and a support plate 64 are disposed in an opposing relationship in front of a feed roller 46 provided on the upstream side, as an alternative to the infrared lamp 49 of the thermal recording apparatus 40 shown in FIGS. 3A through 3C. The heating element 62 is made up of a heating plate, for example. Further, the heating element 62 has a width extending in the sub scanning direction, which corresponds to the width of a portion (corresponding to either the portion X shown in FIG. 3B or the portion Y shown in FIG. 3C) of a thermo-sensitive recording medium S, on which a gradation image is not recorded. The heating element 62 is also formed over a predetermined length along the main scanning direction. The heating element 62 is also displaced in a direction indicated by arrow under the action of an unillustrated displacing means so as to press against the thermo-sensitive recording medium S between the heating element 62 and the support plate 64 fixed to a main body of the thermal recording apparatus.

The thermal recording apparatus 60 according to the present embodiment is basically constructed as described above. Operation of the thermal recording apparatus 60 will next be described below.

Before images are recorded on the thermo-sensitive recording medium S by irradiating the thermo-sensitive recording medium S with the laser beam $L_1$, the unillustrated displacing means is driven to displace the heating element 62 in the direction shown by arrow so that the leading end portion of the thermo-sensitive recording medium S is held between the heating element 62 and the support plate 64 (see FIG. 6A). As a result, the leading end portion of the thermo-sensitive recording medium S is blackened by thermal energy supplied by the heating element 62. Similarly, a rear end portion of the thermo-sensitive recording medium S is blackened by being held between the heating element 62 and the support plate 64 (see FIG. 6C). Thus, a black border can be formed on the leading and rear end portions of the thermo-sensitive recording medium S, other than the images and a black border recorded by the laser beam $L_1$.

In the present embodiment, the heating element 62 and the support plate 64 are disposed in front of the feed roller 46 provided on the upstream side and the black border is formed before the desired images are recorded on the thermo-sensitive recording medium S. However, the heating element 62 and the support plate 64 may be disposed behind a feed roller 48 on the downstream side so that the black border is formed after the images have been recorded on the thermo-sensitive recording medium S.

(Fifth Embodiment)

Figure 7A:
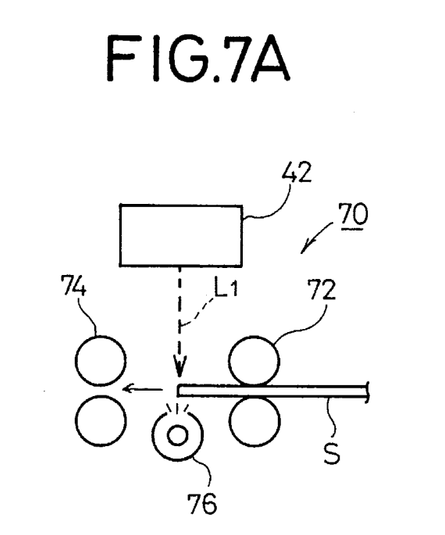
FIGS. 7A through 7C are views schematically showing a thermal recording apparatus according to a fifth embodiment of the present invention.
Figure 7B:
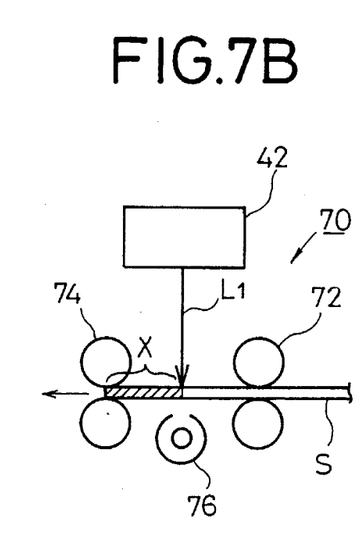
Figure 7C:
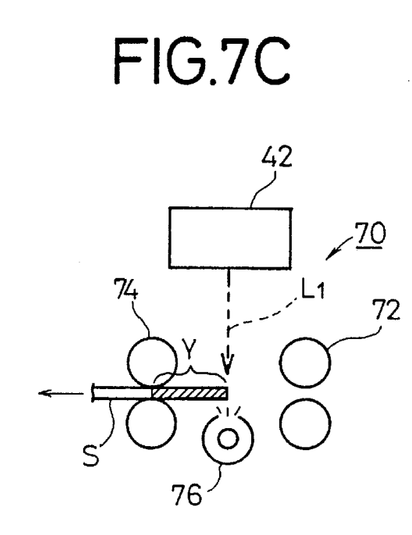

A thermal recording apparatus 70 according to a fifth embodiment of the present invention will next be shown in FIGS. 7A through 7C. In the present embodiment, a pair of nip rollers 72 and 74 is provided on the upstream and downstream sides of recording portions of a thermo-sensitive recording medium S, which are irradiated with a laser beam $L_1$, and an infrared heater 76 is provided between the pair of nip rollers 72 and 74. In this case, the infrared heater 76 serves an auxiliary heating means and is provided as an alternative to the heating roller 44 shown in FIGS. 5A through 5C.

When the rotational speed of each of the nip rollers 72 and 74 for holding the thermo-sensitive recording medium S therebetween is reduced to a predetermined speed at a time when leading and rear end portions of the thermo-sensitive recording medium S approach the infrared heater 76 (see FIGS. 7A and 7C), thermal energy more than or equal to the coloring energy is supplied to the thermo-sensitive recording medium S to form a black border.

(Sixth Embodiment)

Figure 8A:
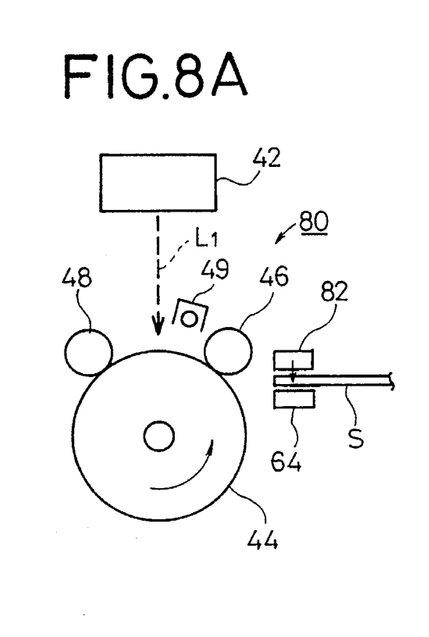
FIGS. 8A through 8C are views schematically illustrating a thermal recording apparatus according to a sixth embodiment of the present invention.
Figure 8B:
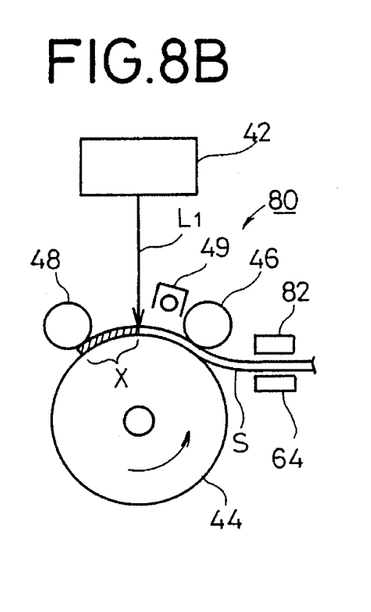
Figure 8C:
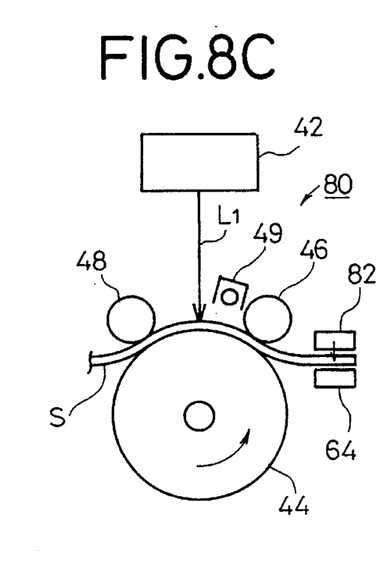

A thermal recording apparatus 80 according to a sixth embodiment of the present invention will next be shown in FIGS. 8A through 8C. The thermal recording apparatus 80 according to the present embodiment differs from the thermal recording apparatus 60 shown in FIGS. 6A through 6C in that a felt member (a nonwoven fabric, for example) 82 with the moisture contained therein is provided as an alternative to the heating element 62 employed in the thermal recording apparatus 60. The felt member 82 has a width corresponding to the width, extending in a sub scanning direction, of an image non-recording portion on a thermo-sensitive recording medium, and is formed so as to extend in a main scanning direction.

Figure 10:
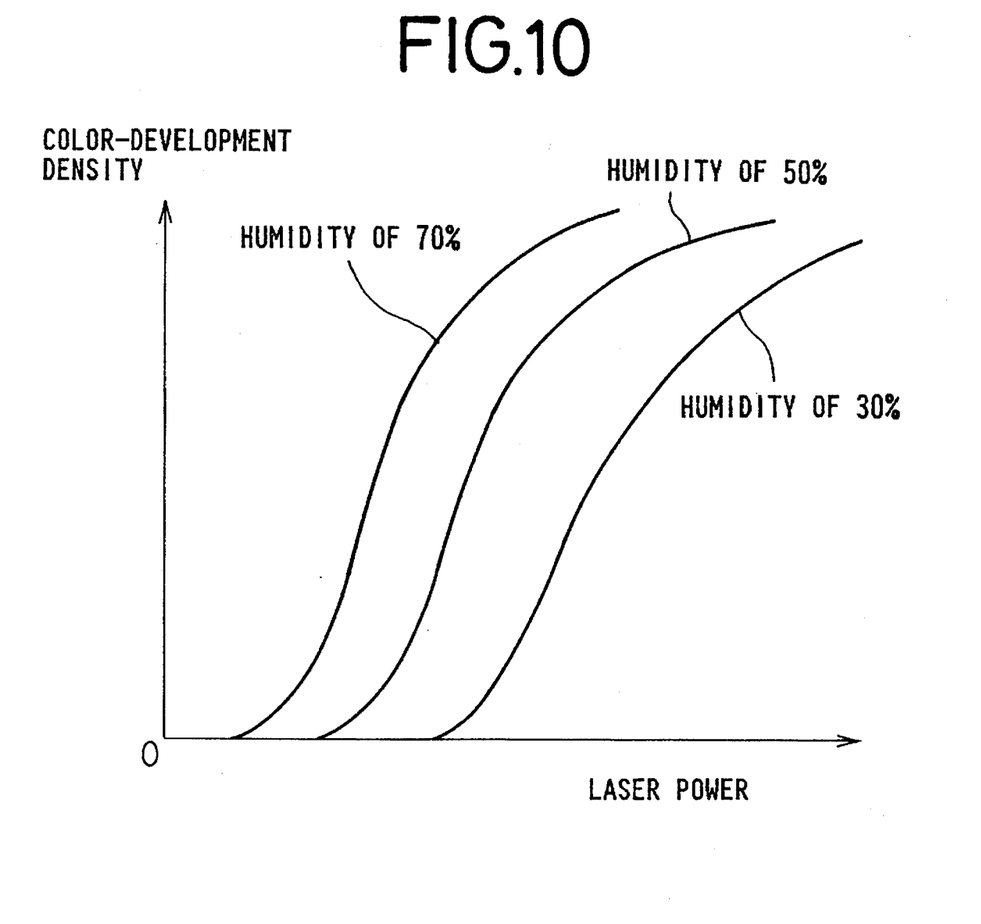
FIG. 10 is a graph for describing the relationship between laser power and the density of developed color at the time that the humidity of a thermo-sensitive recording medium varies.

FIG. 10 shows the relationship between the density of developed color and laser power at the time that the humidity of the thermo-sensitive recording medium S varies. As is understood from FIG. 10, the thermo-sensitive recording medium S has a characteristic that the thermo-sensitive recording medium S is made sensitive with an increase in the humidity. Thus, the humidity or the amount of moisture contained in the image non-recording portion of the thermo-sensitive recording medium S can be increased by pressing the felt member 82 against the image non-recording portion of the thermo-sensitive recording medium S before images are recorded by a laser beam $L_1$ (see FIG. 8A). Accordingly, the portion having the high humidity can be blackened by being heated to a predetermined temperature immediately before coloring by a heating roller 44 and being irradiated with infrared radiation emitted from an infrared lamp 49. In this case, a black border can be formed by controlling thermal energy of the infrared radiation emitted from the infrared lamp 49 so as to reach a low output as compared with the thermal recording apparatus 40 shown in FIGS. 3A through 3C.

Having now fully described the invention, it will be apparent to those skilled in the art that many changes and modification can be made without departing from the spirit or scope of the invention as set forth herein.

What is claimed is:

1. A thermal recording apparatus for recording an image on a thermo-sensitive recording medium which develops color whose density varies in response to thermal energy applied thereto, comprising:

main heating means for supplying thermal energy according to a gradation signal of said image to at least an image region of said thermo-sensitive recording medium for a first time interval required to scan said image region; and auxiliary heating means for supplying said image region with a predetermined thermal energy less than a coloring energy of said thermo-sensitive recording medium for said first time interval, and supplying a region other than said image region with a predetermined thermal energy exceeding said coloring energy for a second time interval required to scan said other region.

2. A thermal recording apparatus according to claim 1, wherein said auxiliary heating means comprises a laser and a modulator, and wherein said modulator modulates a laser beam generated by said laser to supply said image region with said predetermined thermal energy less than the coloring energy for said first time interval, and to supply said other region with said predetermined thermal energy exceeding the coloring energy for said second time interval.

3. A thermal recording apparatus according to claim 2, wherein said laser is a gas laser and said modulator is an acousto-optic modulator.

4. A thermal recording apparatus according to claim 1, wherein said main heating means comprises a semiconductor laser which outputs a laser beam modulated according to said gradation signal of the image to be recorded for said first time interval.

5. A thermal recording apparatus according to claim 1, wherein said main heating means comprises a semiconductor laser which outputs a laser beam modulated according to said gradation signal of the image to be recorded for said first time interval, and wherein said auxiliary heating means comprises a gas laser and an acousto-optic modulator, and said acousto-optic modulator modulates a laser beam generated by said gas laser to supply said image region with said thermal energy less than the coloring energy for said first time interval, and to supply said other region with said thermal energy exceeding the coloring energy for said second time interval.

6. A thermal recording apparatus according to claim 5, wherein outputs of said semiconductor laser and said acousto-optic modulator are combined together into one beam and irradiated onto the surface of said thermo-sensitive recording medium.

7. A thermal recording apparatus according to claim 4, wherein said semiconductor laser further outputs an unmodulated laser beam having predetermined energy for said second time interval.

8. A thermal recording apparatus according to claim 1, wherein said auxiliary heating means comprises a heating member having a length perpendicular to the sub-scanning direction, and is disposed adjacent to or in contact with the thermo-sensitive recording medium which is held between rollers at respective ends upstream and downstream of the image region and fed for sub-scanning, and wherein said thermo-sensitive recording medium is supplied with the predetermined thermal energy exceeding said coloring energy by said auxiliary heating means in each of regions having a predetermined length upstream and downstream of the image region in the sub-scanning direction.

9. A thermal recording apparatus according to claim 5, wherein said semiconductor laser further outputs an unmodulated laser beam having predetermined energy for said second time interval.

10. The thermal recording apparatus according to claim 1, wherein said other region is a black border surrounding said image region.

11. The thermal recording apparatus according to claim 1, further comprising a moistening device disposed upstream of said auxiliary heating means, the moistening device moistening the thermo-sensitive recording medium.

12. The thermal recording apparatus according to claim 8, wherein said heating member is an infrared lamp.

13. The thermal recording apparatus according to claim 8, wherein said heating member is a direct contact heating element.

14. The thermal recording apparatus according to claim 8, wherein said heating member is a heat roller, and wherein the predetermined thermal energy exceeding said coloring energy is supplied to each of the regions upstream and downstream of the image region by reducing a rate at which the thermo-sensitive recording material is conveyed in the sub-scanning direction while each of the regions upstream and downstream of the image region is in contact with the heat roller.

* * * * *